United States Patent
Hatakeyama

(10) Patent No.: US 12,330,715 B2
(45) Date of Patent: Jun. 17, 2025

(54) VEHICLE BODY STRUCTURE

(71) Applicant: TOYOTA JIDOSHA KABUSHIKI KAISHA, Toyota (JP)

(72) Inventor: Mikio Hatakeyama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 424 days.

(21) Appl. No.: 18/082,232

(22) Filed: Dec. 15, 2022

(65) Prior Publication Data
US 2023/0257040 A1    Aug. 17, 2023

(30) Foreign Application Priority Data
Feb. 15, 2022   (JP) .................... 2022-021359

(51) Int. Cl.
*B62D 43/10* (2006.01)
*B60R 16/02* (2006.01)
*B62D 25/20* (2006.01)

(52) U.S. Cl.
CPC ............. *B62D 43/10* (2013.01); *B62D 25/20* (2013.01); *B60R 16/02* (2013.01)

(58) Field of Classification Search
CPC ...... B62D 43/10; B62D 25/20; B62D 25/087; B60R 16/02
See application file for complete search history.

(56) References Cited

U.S. PATENT DOCUMENTS

| | | | |
|---|---|---|---|
| 6,854,543 B2* | 2/2005 | Rowley .................. | B60R 16/04 206/703 |
| 11,345,419 B2* | 5/2022 | Okamura ............... | B62D 43/10 |
| 2014/0020969 A1* | 1/2014 | Okada ..................... | B60R 16/04 180/68.5 |
| 2017/0210217 A1* | 7/2017 | Kim ....................... | B62D 43/10 |

FOREIGN PATENT DOCUMENTS

| | | |
|---|---|---|
| JP | 2020-059365 A | 4/2020 |
| JP | 2021-017123 A | 2/2021 |

* cited by examiner

*Primary Examiner* — Lori Lyjak
(74) *Attorney, Agent, or Firm* — Sughrue Mion, PLLC

(57) ABSTRACT

A vehicle body structure includes a rear floor panel on which a spare tire is placed at a predetermined position, an electric component fixed on the rear floor panel, and a cover member that is fixed on the rear floor panel and covers the electric component, wherein the cover member includes an inclined surface that is inclined with respect to the rear floor panel so as to collide with the spare tire pushed out from the predetermined position, load durability of the rear floor panel is lower than load durability of the cover member, and a space into which the electric component is pushed is provided below the electric component with the rear floor panel interposed between the space and the electric component.

7 Claims, 6 Drawing Sheets

VEHICLE BODY STRUCTURE

CROSS-REFERENCE TO RELATED APPLICATION

This application is based upon and claims the benefit of priority of the prior Japanese Patent Application No. 2022-021359, filed on Feb. 15, 2022, the entire contents of which are incorporated herein by reference.

FIELD

The present disclosure relates to a vehicle body structure.

BACKGROUND

There is a structure in which a rear floor panel on which a spare tire can be mounted is provided at the rear of the vehicle body as disclosed in, for example, Japanese Patent Application Laid-Open No. 2021-017123 (Patent Document 1).

SUMMARY

An electric component such as an electric connector may be installed near the spare tire. In this case, a rear collision of the vehicle body may cause the spare tire to be pushed out from the mounting position to the front side of the vehicle body and collide with the electric component, resulting in damage to the electric component.

To avoid the damage to the electric component, for example, it is conceivable to protect the electric component from the spare tire by covering the electric component with a protector. However, in order to ensure the strength of the protector capable of withstanding the load received from the spare tire, it is necessary to satisfy various strict design conditions such as a material and a plate thickness, for example, which increases the cost of the protector.

The present invention has been made in view of above problems, and an object thereof is to provide a low-cost vehicle body structure capable of inhibiting damage to electric components due to collision with a spare tire.

In one aspect of the present disclosure, there is provided a vehicle body structure including: a rear floor panel on which a spare tire is placed at a predetermined position; an electric component fixed on the rear floor panel; and a cover member that is fixed on the rear floor panel and covers the electric component; wherein the cover member includes an inclined surface that is inclined with respect to the rear floor panel so as to collide with the spare tire pushed out from the predetermined position, wherein load durability of the rear floor panel is lower than load durability of the cover member, and wherein a space into which the electric component is pushed is provided below the electric component with the rear floor panel interposed between the space and the electric component.

In the above vehicle body structure, the cover member and the rear floor panel may have a sheet metal structure, and a plate thickness of the cover member may be thicker than a plate thickness of the rear floor panel.

In the above vehicle body structure, a tensile strength of the cover member may be greater than a tensile strength of the rear floor panel.

In the above vehicle body structure, the electric component may be located below a wheel of the spare tire.

In the above vehicle body structure, the inclined surface may be provided with a first rib along an inclination direction of the inclined surface.

In the above vehicle body structure, the cover member may include a support portion that supports the inclined surface with respect to the rear floor panel, and the support portion may be provided with a second rib along a support direction.

In the above vehicle body structure, the vehicle body structure may include a pair of plate-shaped brackets attached to the rear floor panel, the cover member may cover one end portion of the electric component and may be fixed to the rear floor panel through the pair of brackets, and in a front view of the rear floor panel, the pair of brackets may sandwich another end portion of the electric component exposed from the cover member.

DETAILED DESCRIPTION (Structure of the Rear Portion of a Vehicle Body)

Figure 1:
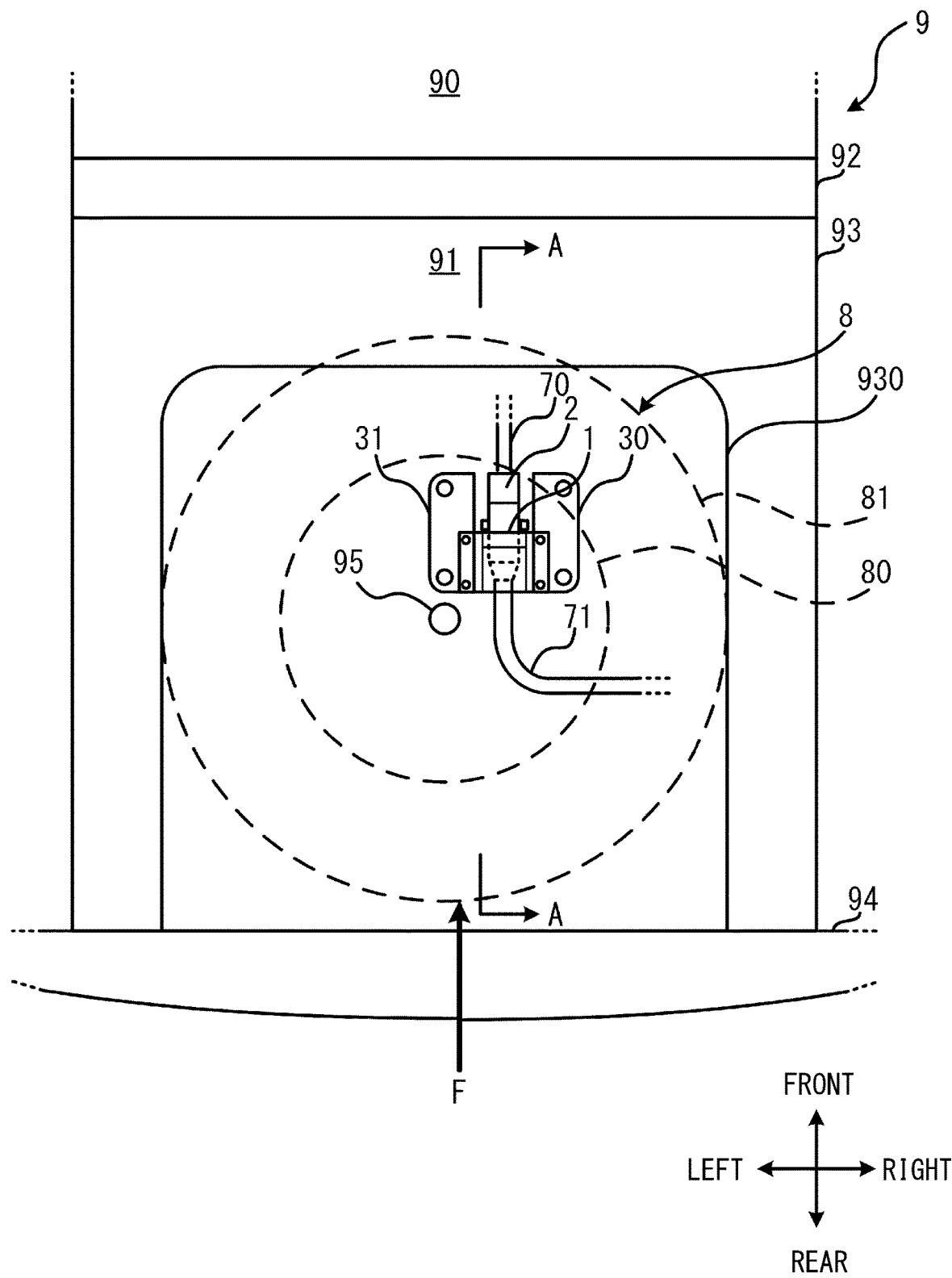
FIG. 1 is a diagram illustrating a structure of the rear portion of a vehicle body as viewed from above.

FIG. 1 is a diagram illustrating a structure 9 of the rear portion of a vehicle body in a top view. In FIG. 1, a front side, a rear side, a right side, and a left side of the vehicle body are respectively indicated by "front", "rear", "right", and "left".

The structure 9 of the rear portion of the vehicle body is an example of the vehicle body structure. The structure 9 includes a cross member 92 provided between a vehicle interior 90 and a luggage space 91, a rear floor panel 93 that is the floor of the luggage space 91, an electric connector 2, and a protector 1 that covers the electric connector 2. The rear floor panel 93 has a sheet metal structure and is a plate-shaped member formed of iron or the like. The rear floor panel 93 is provided with a rear floor pan 930 on which a spare tire (see dotted line) 8 is placed. The rear floor pan 930 is a recessed portion that is recessed downward relative to other portions of the rear floor panel 93.

The spare tire 8 includes a wheel 80 and a tire 81. The center of the spare tire 8 is fixed to a fixture 95, which is provided substantially at the center of the rear floor pan 930 in a front view, through a fixing shaft. The spare tire 8 is within the width of the rear floor pan 930 in the left-right direction of the vehicle body. A part of the front side of the tire 81 protrudes from the rear floor pan 930. The spare tire 8 is placed in the position of the fixture 95 while being inclined with respect to the direction in which the rear floor pan 930 extends.

A rear panel 94 is provided behind the rear floor panel 93. The rear panel 94 is a plate-shaped exterior panel extending in the left-right direction of the vehicle body.

The electric connector 2 is an example of an electric component. The electric connector 2 is fixed to the rear floor panel 93 below the wheel 80. The electric connector 2 electrically connects between two electric cables 70 and 71. The electric connector 2 has a substantially cylindrical shape, and is fixed to the rear floor pan 930 so that the longitudinal direction thereof is along the front-rear direction of the vehicle body. As an example, one electric cable 70 is routed so as to extend from the electric connector 2 toward the front of the vehicle body, and the other electric cable 71 is routed so as to extend from the electric connector 2 toward the rear of the vehicle body and then bend toward the right side of the vehicle body.

The protector 1 is an example of a cover member. The protector 1 covers a part at the rear side of the vehicle body of the electric connector 2. For example, the protector 1 covers the electric connector 2 from the top and both sides. The detailed shape of the protector 1 will be described later.

The protector 1 is fixed to the rear floor panel 93 through a pair of plate-shaped brackets 30 and 31. The brackets 30 and 31 are attached to the rear floor panel 93 on both left and right sides of the protector 1 in a front view of the rear floor panel 93.

For example, when the vehicle body is struck from behind by another vehicle body, a force F directed from the rear to the front acts on the spare tire 8. As a result, the spare tire 8 is pushed forward from the mounting position in the rear floor pan 930. This causes the inner peripheral surface of the wheel 80 and the lower end portion of the tire 81 to come into contact with the protector 1.

Under this situation, in order to secure the strength of the protector 1 capable of withstanding the load received from the spare tire 8, it is necessary to satisfy various strict design conditions such as a material and a plate thickness, for example, and thus the cost of the protector 1 increases. Therefore, as described below, the load durability of the rear floor panel 93 is made lower than the load durability of the protector 1. As a result, a part of the load applied to the protector 1 from the spare tire 8 is distributed to the rear floor pan 930, and the rear floor panel 93 is depressed. The electric connector 2 is pushed downward and thereby protected.

(Configuration of the Protector)

Figure 2:
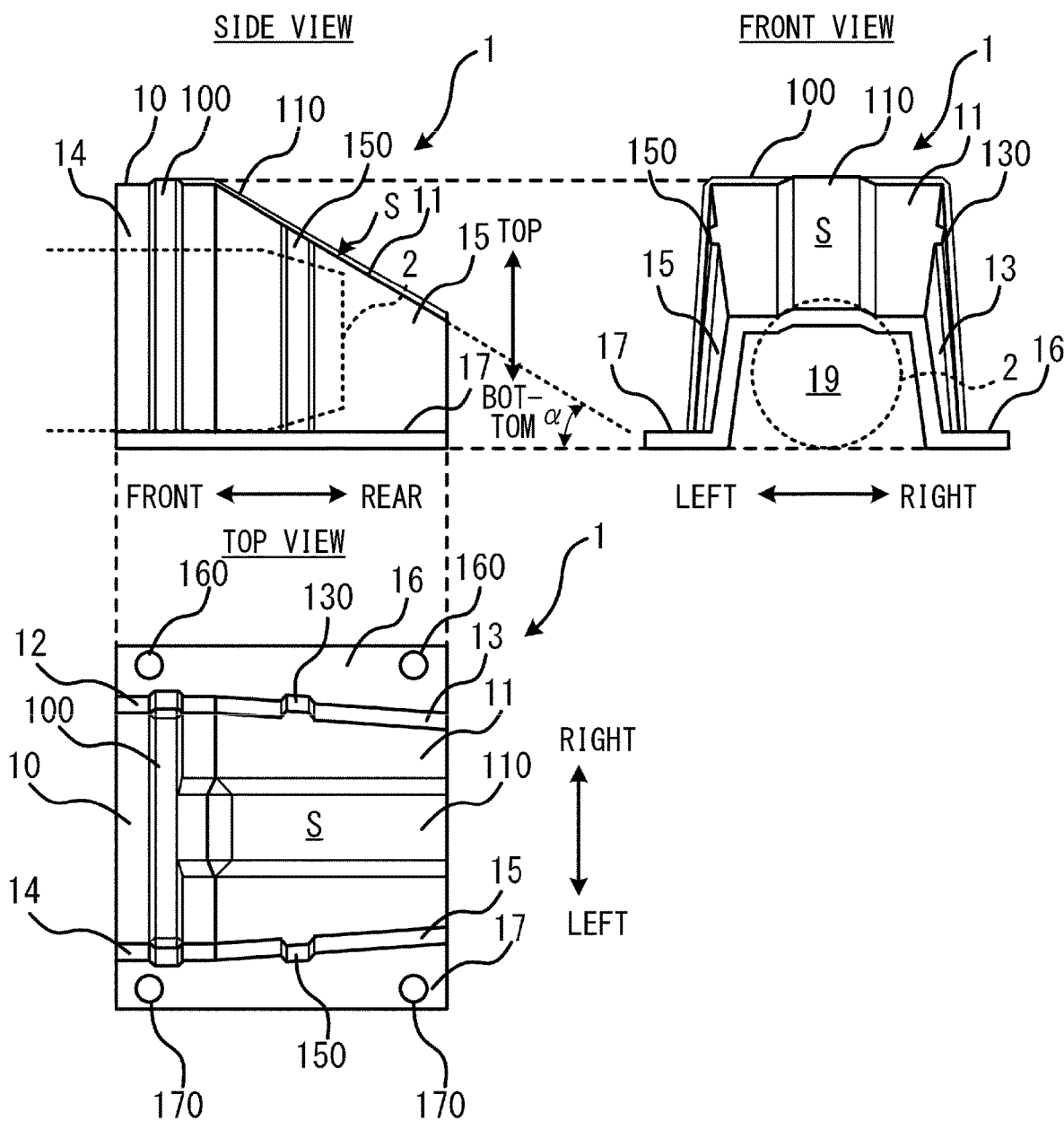
FIG. 2 is a plan view illustrating a protector.

FIG. 2 is a plan view illustrating the protector 1. FIG. 2 illustrates the shape of the protector 1 in a front view as seen from the rear of the vehicle body, the shape of the protector 1 in a side view as seen from the left side of the vehicle body, and the shape of the protector 1 in a top view as seen from above the vehicle body. In the drawings of the respective shapes, the front-rear direction, the top-bottom direction, and the left-right direction of the vehicle body are indicated.

The protector 1 has a sheet metal structure and is formed by, for example, sheet-metal processing of an iron plate. The protector 1 has a substantially U-shape in a front view so as to cover the electric connector 2 from above the rear floor pan 930.

The protector 1 includes a top plate 10, an inclined plate 11, side plates 12 to 15, and fixed plates 16 and 17. The fixed plates 16 and 17 extend substantially in parallel to the rear floor pan 930, and are fixed to the rear floor pan 930 through the brackets 30 and 31, respectively.

The fixed plates 16 and 17 have through holes 160 and 170 penetrating therethrough in the top-bottom direction, respectively. The through holes 160 and 170 are provided at the ends of the fixed plates 16 and 17 in the front-rear direction of the vehicle body, for example. Fastening members such as bolts are inserted through the through holes 160 and 170 and the through holes of the brackets 30 and 31. As a result, the fixed plates 16 and 17 are fixed to the rear floor pan 930 through the brackets 30 and 31, respectively.

The side plates 12 and 14 are erected so as to extend from the ends of the fixed plates 16 and 17 to the end of the top plate 10, respectively. The side plates 12 and 14 support the top plate 10 with respect to the fixed plates 16 and 17 in the top-bottom direction, respectively. The side plates 12 and 14 are not orthogonal to the fixed plates 16 and 17 nor the top plate 10, and are inclined so that the interval therebetween in the left-right direction increases from the top plate 10 toward the fixed plates 16 and 17 in a substantially truncated chevron shape.

The side plates 13 and 15 are an example of a support portion. The side plates 13 and 15 are erected so as to extend from the end of the fixed plates 16 and 17 to the end of the inclined plate 11, respectively. Here, the inclined plate 11 is provided so as to extend forward from the top plate 10. The side plates 13 and 15 support the inclined plate 11 with respect to the fixed plates 16 and 17 in the top-bottom direction, respectively. The side plates 13 and 15 are not orthogonal to the fixed plates 16 and 17, respectively, and are inclined so that the interval therebetween increases in a substantially truncated chevron shape in the left-right direction from the inclined plate 11 toward the fixed plates 16 and 17. In addition, the side plates 13 and 15 are provided so that the interval therebetween decreases toward the front from the side plates 12 and 14 supporting the top plate 10.

The inclined plate 11 includes an inclined surface S that is inclined with respect to the rear floor pan 930 so as to collide with the spare tire 8 pushed out from a predetermined position. For example, the inclined surface S is inclined rearward so as to face the inner peripheral surface of the wheel 80. Here, an angle $\alpha$ of the inclined surface S with respect to the surface of the rear floor pan 930 is, for example, 22.8 degrees. The inclined surface S is the outer surface of the protector 1, and faces the upward direction of the vehicle body and the direction in which the spare tire 8 is pushed out when the vehicle body is struck from behind.

A rear end portion of the electric connector 2 is disposed in a space 19 surrounded by the side plates 12 to 15, the top plate 10, and the inclined plate 11. The side plates 12 to 15 cover the rear end portion of the electric connector 2 from the left and right. The rear end portion of the electric connector 2 is an example of one end portion of an electrical component.

The top plate 10 and the inclined plate 11 cover the rear end portion of the electric connector 2 from above and from behind. Therefore, the protector 1 can protect the electric connector 2 from the spare tire 8 pushed forward. In this example, since the protector 1 covers only the rear end portion of the electric connector 2, the length of the protector 1 can be made shorter than in the case in which the entire electric connector 2 is covered, and the cost of the protector 1 is reduced. Note that the protector 1 is not limited to this, and may cover the entire electric connector 2 including the front end portion thereof.

When a collision (rear-end collision or the like) from the rear of the vehicle body occurs, the spare tire 8 may be detached from the fixture 95 and pushed forward to collide with the inclined surface S of the protector 1. In this case, the protector 1 distributes part of the load applied to the inclined surface S from the collided spare tire 8 to the rear floor pan 930.

The protector 1 has a plurality of ribs 100, 110, 130, and 150 in order to improve strength in preparation for collision with the spare tire 8. The rib 100 is provided across the side plates 12 and 14 and the top plate 10. The rib 100 extends along the left-right direction in the top plate 10, and extends along the direction in which the top plate 10 is supported (a support direction) in the side plates 12 and 14. Therefore, deformation of the side plates 12 and 14 and the top plate 10 due to collision with the spare tire 8 is reduced.

The rib 110 is an example of a first rib. The rib 110 is provided along the inclination direction of the inclined surface S in the inclined plate 11. Therefore, deformation of the inclined surface S due to the collision with the spare tire 8 is reduced. The rib 110 extends to the top plate 10 and is connected to the rib 100.

The ribs 130 and 150 are an example of a second rib. The ribs 130 and 150 extend along the direction in which the inclined plate 11 is supported (a support direction) in the side plates 13 and 15. Therefore, deformation of the side plates 13 and 15 due to the collision with the spare tire 8 is reduced.

(Behavior at Spare Tire Collision)

Next, a behavior when the spare tire 8 is pushed out to the front side of the vehicle body and collides with the protector 1 will be described.

Figure 3:
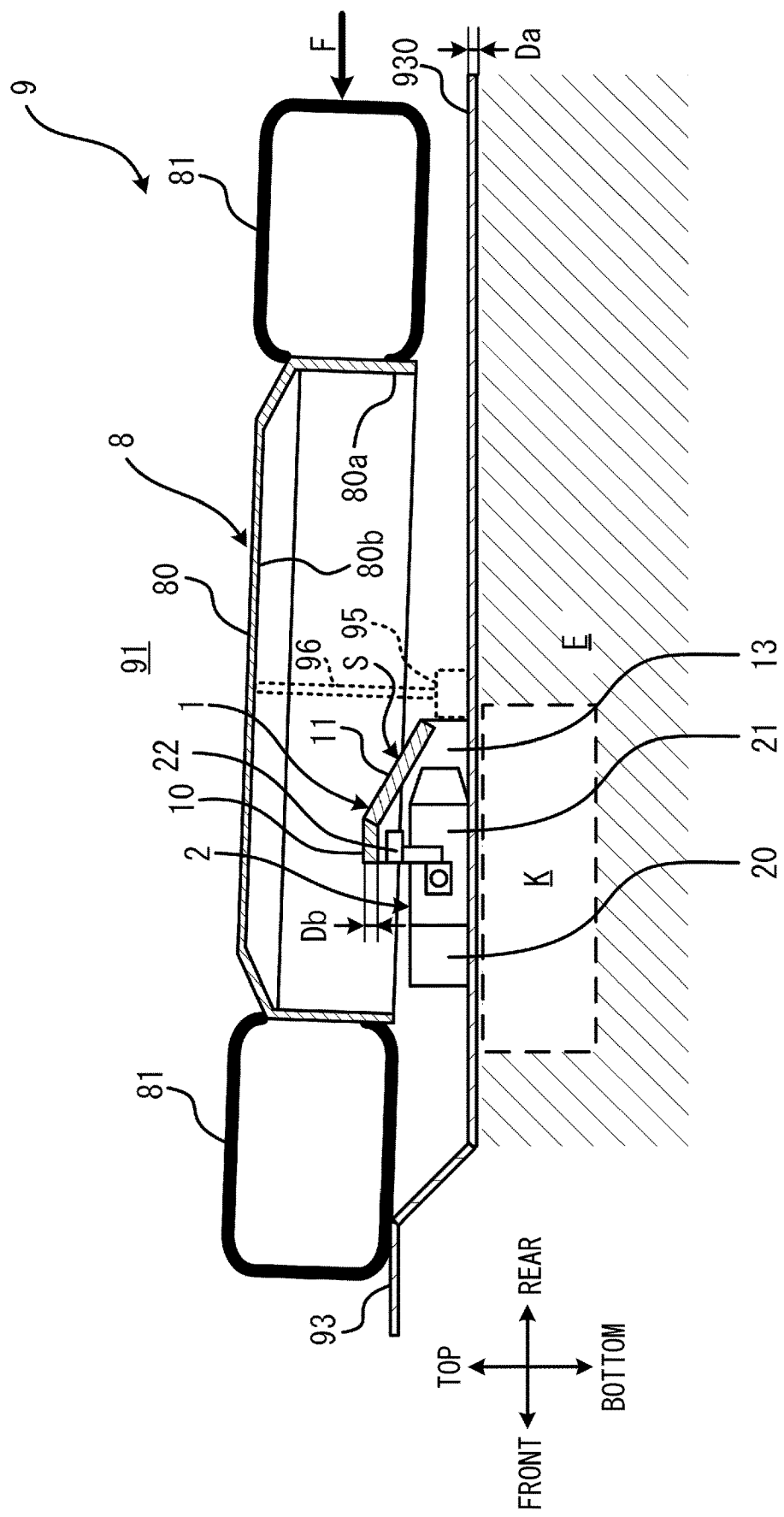
FIG. 3 is a cross-sectional view of a structure of the rear portion of the vehicle body taken along line A-A in FIG. 1.

FIG. 3 is a cross-sectional view of the structure 9 of the rear portion of the vehicle body taken along line A-A in FIG. 1. Here, the cross section of the spare tire 8 is schematically illustrated for convenience. The spare tire 8 is fixed to the fixture 95 of the rear floor pan 930 through a fixing shaft 96 connected to substantially the center of the wheel 80 in a top view.

The electric connector 2 is located below the wheel 80. By arranging the electric connector 2 in this manner, the electric connector 2 can be accommodated even in a narrow storage space such as the luggage space 91.

The electric connector 2 has a front connector 20 and a rear connector 21. The front connector 20 includes a terminal electrically connected to the electric cable 70, and the rear connector 21 includes a terminal electrically connected to the electric cable 71. In FIG. 3, the electric cables 70 and 71 are not illustrated. The front connector 20 and the rear connector 21 are connected to each other. Thus, the electric cables 70 and 71 are electrically connected to each other.

The rear connector 21 is provided with a lever 22 for releasing the connection between the front connector 20 and the rear connector 21. The lever 22 is provided so as to cross the upper portion from both side surfaces of the rear connector 21.

The protector 1 covers the rear connector 21 from above the rear floor pan 930. The top plate 10 is positioned above the lever 22. Therefore, the connection between the front connector 20 and the rear connector 21 is inhibited from being released by the collision of the spare tire 8 with the lever 22.

The inclined plate 11 covers the rear end portion of the rear connector 21 obliquely from above. The height of the inclined surface S from the rear floor pan 930 decreases from the front toward the rear. The inclined surface S faces an inner peripheral surface 80a of the rear side of the wheel 80 and a back surface 80b of the wheel 80. Therefore, when the spare tire 8 is detached from the fixture 95 and moves forward, the inner peripheral surface 80a of the rear side of the wheel 80 comes into contact with the inclined surface S.

The load durability of the rear floor panel 93 is lower than the load durability load of the protector 1. Therefore, the rear floor panel 93 is more fragile than the protector 1. That is, the rear floor panel 93 is more easily deformed than the protector 1 when a load is applied thereto.

For example, by making the plate thickness Db of the protector 1 greater than the plate thickness Da of the rear floor panel 93, it is possible to easily provide a difference between the load durability of the protector 1 and the load durability of the rear floor panel 93. In this case, as an example, the plate thickness Db of the protector 1 can be set to 2 (mm), and the plate thickness Da of the rear floor panel 93 can be set to 0.65 (mm).

In addition to or instead of the difference between the plate thicknesses Da and Db, the tensile strength of the protector 1 may be greater than the tensile strength of the rear floor panel 93. In this case, it is assumed that the protector 1 and the rear 30 floor panel 93 are formed of iron, and as an example, the tensile strength of the protector 1 can be set to 440 (MPa), and the tensile strength of the rear floor panel 93 can be set to 270 (MPa).

Various devices E are installed below the rear floor panel 93, but a space K (hereinafter referred to as a push-in space K) into which the electric connector 2 is to be pushed is provided below the electric connector 2 with the rear floor pan 930 interposed between the electric connector 2 and the push-in space K. When the spare tire 8 collides with the protector 1, the rear floor pan 930 to which the electric connector 2 is fixed is depressed downward by the load of the spare tire 8. As a result, the electric connector 2 is pushed into the push-in space K together with the protector 1 and the rear floor pan 930. Therefore, the push-in space K has substantially the same volume as the protector 1 and the electric connector 2.

For example, when the vehicle body is struck from behind by another vehicle body, the force F directed from the rear to the front acts on the spare tire 8. As a result, the spare tire 8 is pushed forward from the mounting position in the rear floor pan 930.

Figure 4:
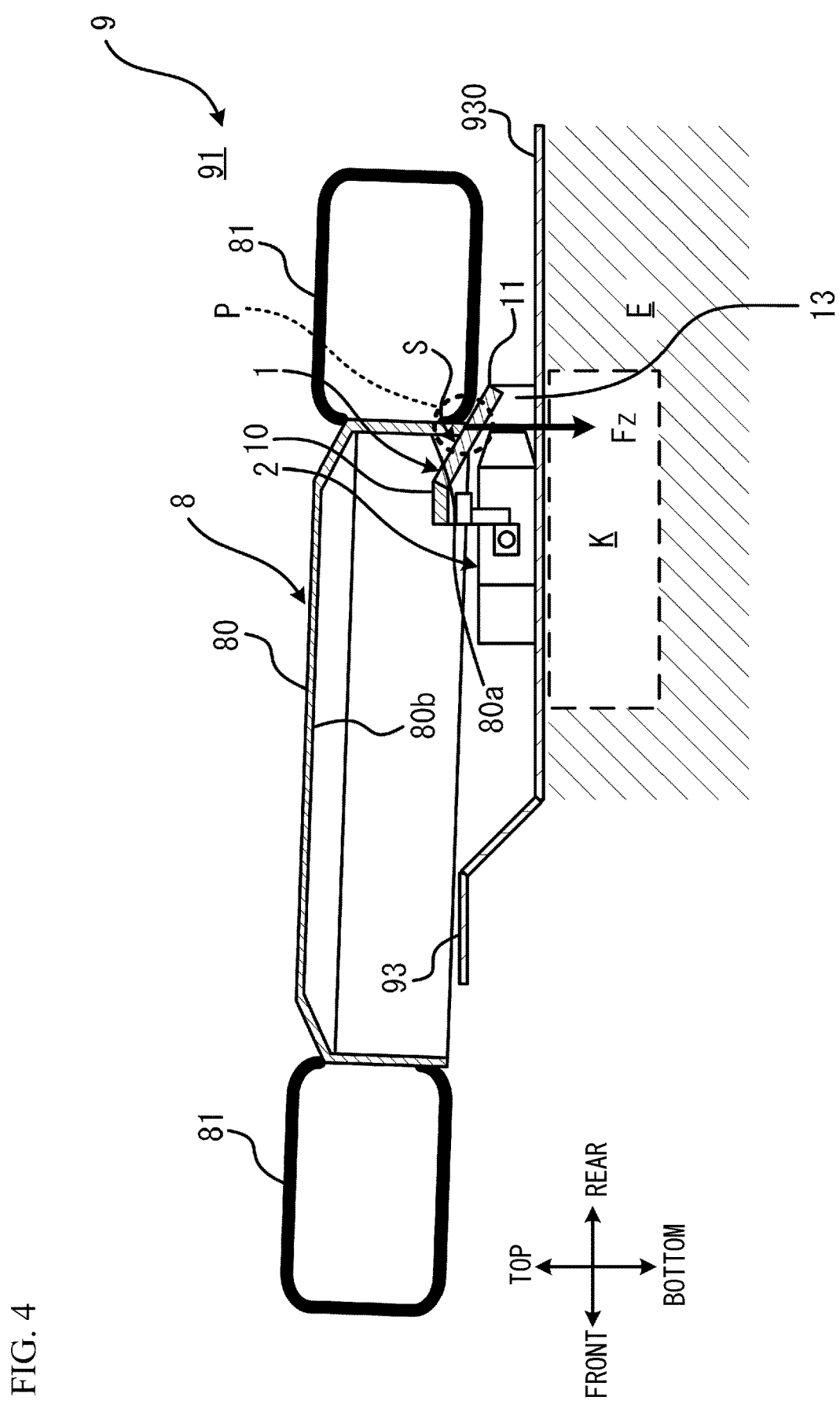
FIG. 4 is a cross-sectional view of the structure of the rear portion of the vehicle body, illustrating a state when the spare tire is pushed forward.

FIG. 4 is a cross-sectional view of the structure 9 of the rear portion of the vehicle body, illustrating a state when the spare tire 8 is pushed forward. In FIG. 4, the same reference numerals are assigned to the same components as in FIG. 3, and the description thereof will be omitted.

As indicated by reference character P, the inclined surface S of the protector 1 is in contact with the inner peripheral surface 80a of the wheel 80. In this structure, the protector 1 receives a forward load from the spare tire 8 onto the inclined surface S.

However, since the inclined surface S is inclined with respect to the rear floor pan 930, a part of the load of the spare tire 8 is distributed to the rear floor pan 930. As a result, the rear floor pan 930 receives a downward distributed load Fz. Therefore, the rear floor pan 930 below the electric connector 2 is deformed, and the electric connector 2 is pushed into the push-in space K. When the spare tire 8 is installed substantially parallel to the rear floor pan 930, the angle α of the inclined surface S with respect to the rear floor pan 930 is preferably set to 45 degrees or less so that a sufficient distributed load Fz is applied to the rear floor pan 930, but is not limited thereto.

Figure 5:
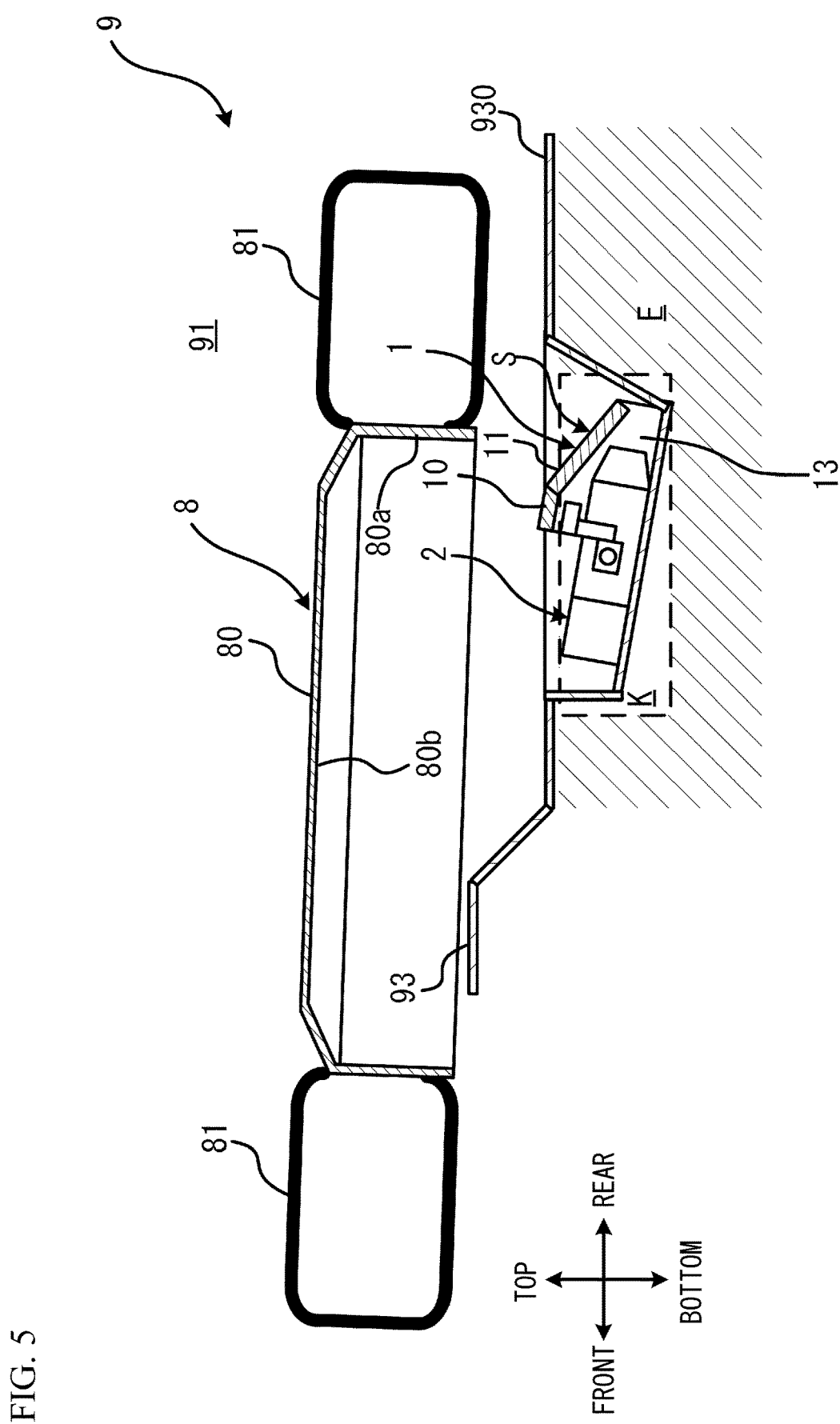
FIG. 5 is a cross-sectional view of the structure of the rear portion of the vehicle body, illustrating a state when the electric connector is pushed into the push-in space.

FIG. 5 is a cross-sectional view of the structure 9 of the rear portion of the vehicle body, illustrating a state when the electric connector 2 is pushed into the push-in space K. In FIG. 5, the same reference numerals are assigned to the same components as in FIG. 3, and the description thereof will be omitted.

The rear floor pan 930 below the electric connector 2 is deformed by the distributed load Fz received from the protector 1 and is recessed into the push-in space K. Since the load durability of the protector 1 is higher than that of the rear floor pan 930, the amount of deformation of the protector 1 is smaller than that of the rear floor pan 930 at the time of collision with the spare tire 8, and the protector 1 is pushed into the push-in space K together with the rear floor pan 930 while covering the electric connector 2.

The electric connector 2 is fixed to the rear floor pan 930 together with the protector 1. Therefore, since the electric connector 2 is also pushed into the push-in space K, it is possible to avoid collision with the spare tire 8 and reduce damage. The height of the push-in space K is preferably higher than that of the protector 1, but is not limited to this, and may be any height as long as the electric connector 2 can avoid collision with the spare tire 8.

The protector 1 is fixed to the rear floor pan 930 through a pair of the plate-shaped brackets 30 and 31. When the protector 1 covers only the rear end portion of the electric connector 2 as in this example, the left and right sides of the front end portion of the electric connector 2 exposed from the protector 1 are sandwiched by the brackets 30 and 31, so that the sandwiched portion can be sufficiently pushed into the push-in space K.

Figure 6:
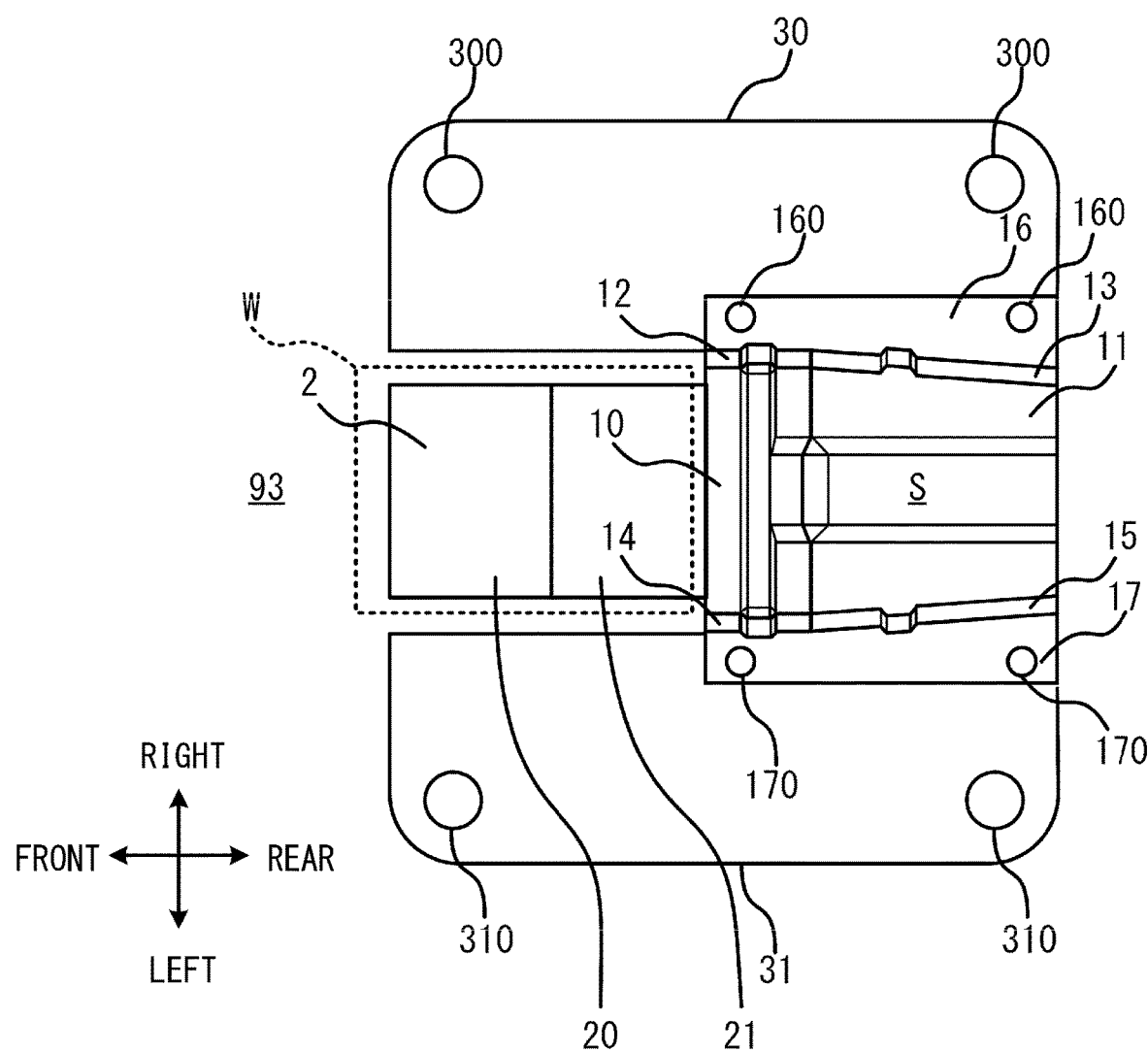
FIG. 6 is a top view of the electric component, the protector, and the brackets.

FIG. 6 is a top view of the electric connector 2, the protector 1, and the brackets 30 and 31. In FIG. 6, the same reference numerals are assigned to the same components as in FIG. 1 and FIG. 2, and the description thereof will be omitted.

As an example, the brackets 30 and 31 have a substantially rectangular flat plate shape. Fastening holes 300 and 310 are provided at the corners of both ends of the long sides of the brackets 30 and 31, respectively. The brackets 30 and 31 are attached to the rear floor pan 930 by fastening members such as bolts to the fastening holes 300 and 310.

Further, parts of the front sides of the brackets 30 and 31 are overlapped with the fixed plates 16 and 17 of the protector 1, respectively. The fixed plates 16 and 17 are fixed to the rear floor pan 930 through the brackets 30 and 31, respectively. Therefore, the load applied from the spare tire 8 to the inclined surface S of the protector 1 is applied to the brackets 30 and 31 as the distributed load Fz.

The brackets 30 and 31 are provided so as to extend in the front-rear direction at both the left and right sides of the electric connector 2 and the protector 1. Since the length of the protector 1 is shorter than the length of the electric connector 2 in the front-rear direction of the vehicle body, a front-side end portion W of the electric connector 2 is exposed from the protector 1. Here, in a front view of the rear floor pan 930, a pair of the brackets 30 and 31 sandwich the front-side end portion W of the electric connector 2 from both left and right sides.

Therefore, the brackets 30 and 31 can deform the rear floor pan 930 by applying the distributed load Fz to the rear floor pan 930 at both left and right sides of the front-side end portion W of the electric connector 2. Therefore, the front-side end portion W of the electric connector 2 can be more sufficiently pushed into the push-in space K than when the brackets 30 and 31 are not provided.

As described above, in the structure 9 of the rear portion of the vehicle body, the protector 1 includes the inclined surface S that is inclined with respect to the rear floor pan 930 so as to collide with the spare tire 8 pushed out from a predetermined position in the rear floor pan 930, the load durability of the rear floor pan 930 is lower than the load durability of the protector 1, and the push-in space K is provided below the electric connector 2 with the rear floor pan 930 interposed between the electric connector 2 and the push-in space K.

Therefore, the protector 1 can distribute the load applied to the inclined surface S from the spare tire 8 to the rear floor pan 930, and can deform the rear floor pan 930 having a low load durability by the distributed load Fz so as to push down the rear floor pan 930 toward the push-in space K. Therefore, since the electric connector 2 is pushed into the push-in space K together with the rear floor pan 930 below the electric connector 2, damage to the electric connector 2 due to the spare tire 8 is reduced.

Further, in the above-described structure 9, since the load durability of the rear floor pan 930 can be set lower than the load durability of the protector 1, the strength required for the protector 1 can be reduced. Therefore, for example, design conditions such as a material and a plate thickness of the protector 1 are relaxed, and it is possible to reduce the cost of the protector 1.

Although some embodiments of the present invention have been described in detail, the present invention is not limited to the specific embodiments but may be varied or changed within the scope of the present invention as claimed.

What is claimed is:

1. A vehicle body structure comprising:
a rear floor panel on which a spare tire is placed at a predetermined position;
an electric component fixed on the rear floor panel; and
a cover member that is fixed on the rear floor panel and covers the electric component;
wherein the cover member includes an inclined surface that is inclined with respect to the rear floor panel so as to collide with the spare tire pushed out from the predetermined position,
wherein load durability of the rear floor panel is lower than load durability of the cover member, and
wherein a space into which the electric component is pushed is provided below the electric component with the rear floor panel interposed between the space and the electric component.

2. The vehicle body structure according to claim 1, wherein the cover member and the rear floor panel have a sheet metal structure, and
wherein a plate thickness of the cover member is thicker than a plate thickness of the rear floor panel.

3. The vehicle body structure according to claim 1, wherein a tensile strength of the cover member is greater than a tensile strength of the rear floor panel.

4. The vehicle body structure according to claim 1, wherein the electric component is located below a wheel of the spare tire.

5. The vehicle body structure according to claim 1, wherein the inclined surface is provided with a first rib along an inclination direction of the inclined surface.

6. The vehicle body structure according to claim 1,
wherein the cover member includes a support portion that supports the inclined surface with respect to the rear floor panel, and
wherein the support portion is provided with a second rib along a support direction.

7. The vehicle body structure according to claim 1, further comprising a pair of plate-shaped brackets attached to the rear floor panel,
wherein the cover member covers one end portion of the electric component and is fixed to the rear floor panel through the pair of brackets, and
wherein in a front view of the rear floor panel, the pair of brackets sandwich another end portion of the electric component exposed from the cover member.

* * * * *